United States Patent Office 3,472,613
Patented Oct. 14, 1969

3,472,613
PROCESS FOR CONVERTING AMMONIUM PARA-TUNGSTATE TO A MORE SOLUBLE FORM
John O. Hay, Bratenahl Village, and Raymond J. Grodek, Cleveland, Ohio, assignors to Kewanee Oil Company, Bryn Mawr, Pa., a corporation of Delaware
No Drawing. Filed Mar. 22, 1966, Ser. No. 536,274
Int. Cl. C22b 59/00
U.S. Cl. 23—23         16 Claims

ABSTRACT OF THE DISCLOSURE

This invention comprises a process for converting relatively water-insoluble ammonium paratungstate to a more highly water-soluble form by heating the paratungstate while in contact with water at a temperature of 50–120° C., preferably 70–101° C., and at a pH of 1.75–3.5, preferably 1.75–2.2 for at least a substantial portion of the heating period, until the ammonium paratungstate is substantially completely dissolved in the water.

---

This invention relates to a process for converting relatively water insoluble ammonium paratungstate to a more highly water soluble form. Specifically it relates to a method of making relatively concentrated solutions of ammonium metatungstate from a relatively insoluble ammonium paratungstate. More specifically it relates to a process for making ammonium paratungstate more soluble by heating it in contact with water under controlled pH and temperature conditions.

Ammonium paratungstate is a relatively insoluble salt which dissolves only to the extent of 4.5 parts in 100 parts of water at 22° C. and has limited solubility in hot water. On the other hand, ammonium metatungstate dissolves to the extent of 120 parts per 100 parts of water at 15° C. and is very soluble in hot water. It is frequently desirable to obtain a relatively high concentration of tungsten in solution, i.e. 30% $WO_3$ or more at ambient temperature. This is done most readily by dissolving ammonium metatungstate. On the other hand, ammonium paratungstate is a more common product which can be obtained by several methods during the recovery of tungsten from its ores. Heretofore, the market price of ammonium metatungstate has been much higher, compared to ammonium paratungstate, because of the difficulty entailed in manufacturing the former.

There have also been marked differences in characteristics between the various ammonium paratungstates available on the market because of the different methods used in its production. These differences are reflected in their adaptability to conversion to the more soluble ammonium metatungstate. Without discussing at length the chemistry of the heteropoly acids of tungsten, which is not thoroughly understood as yet, it is believed that these differences in amenability to conversion of ammonium paratungstate to ammonium metatungstate are due to the time strength of solution, and other varied conditions under which the ammonium paratungstate was formed. These variations in conditions of preparation lead in turn to different polymer structures.

Formula-wise, the essential difference between ammonium paratungstate and ammonium metatungstate is shown by the following simplified equation

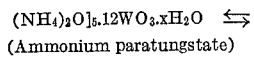
(Ammonium paratungstate)
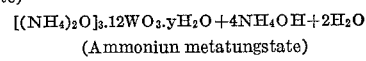
(Ammonium metatungstate)

This equation shows that generally if two moles of water and four of ammonium hydroxide are removed from ammonium paratungstate, the equilibrium will shift to the right and the result will be ammonium metatungstate. The literature cites a number of methods by which this can be accomplished with ordinary ammonium paratungstate, such as boiling ammonium paratungstate for a considerable length of time in aqueous solution with hydrated tungstic oxide and boiling a water solution of ammonium paratungstate without the addition of any other reagent for several days. Still another method is to heat the dry salt, ammonium paratungstate, in an oven at various temperatures up to 350° C. and for various periods of time to drive off excess ammonia and effect the conversion to ammonium metatungstate. These are rather impractical and relatively expensive methods.

There is a rather refractory form of ammonium paratungstate now commercially available which is not substantially amenable to any of the treatments designed to convert ammonium paratungstate to ammonium metatungstate. It has been suggested in U.S. Patent No. 2,-739,132 that ammonium paratungstate can be made relatively soluble by the addition of hydrogen peroxide. This treatment produces a solution of ammonium peroxytungstate, the exact composition of which depends on the acidity or alkalinity of the solution as well as other factors. The amount of hydrogen peroxide required is very considerable, making the process economically unattractive. Moreover, the peroxytungstates are relatively unstable compounds which decompose in a relatively short period of time, e.g., a matter of hours, into insoluble white products which may not again be put into solution by direct means. Efforts at introducing stabilizers have not proved very effective.

While it might appear that the addition of a mineral acid to ammonium paratungstate might result in conversion to ammonium metatungstate by neutralization of some of the ammonium radicals, it has been found that the direct addition of a mineral acid results in the formation of a quantity of hydrated tungstic oxide which cannot again be solubilized in ammonia solutions. Apparently the acid is used up by part of the ammonium paratungstate in forming hydrated tungstic oxide, while the rest of the ammonium paratungstate is virtually unaffected and remains as such.

In accordance with the present invention it has been found that ammonium paratungstate can be gradually converted to ammonium metatungstate by the controlled gradual addition of dilute mineral acid to an aqueous slurry of ammonium paratungstate. With proper control, the amount of byproduct hydrated tungstic oxide formed is approximately 0.1%, based on the total tungstate (as oxide) content of the slurry.

Of the mineral acids, nitric acid is preferred since the resultant final solution contains only ammonium nitrate as an impurity. This is important as subsequent use of the solution may be in the manufacture of catalysts where a support is impregnated with the tungsten solution and is later calcined to drive off ammonia and leave pure tungstic oxide on the support. It is obvious that in this case the ammonium nitrate will be volatilized at a low temperature thus preventing any possible contamination of the said catalyst.

In cases where other common mineral acids, hydrochloric and sulfuric, are used, ammonium chloride and ammonium sulfate, respectively, will be the contaminants. These, likewise, can be volatilized during calcination but require relatively higher temperatures and introduce the possibility that some chloride or sulfate will be included as trace impurities in the product. Furthermore, the chloride or sulfate anion may react with other metals present or with the support to give some undesirable sulfates or chlorides.

When nitric acid is used to effect the conversion of ammonium paratungstate to ammonium metatungstate, the ammonium nitrate impurity is decomposed at 169° C. at ambient pressures and its decomposition products are not likely to react with other components of a mixture in which the tungsten oxide is incorporated.

The mineral acid, whether it is nitric, hydrochloric, sulfuric, or other, is added as a dilute solution in order to minimize the local effect of strong acid on the ammonium paratungstate slurry. It is preferred to use a concentration of 1 part of 70% nitric acid to between 10 and 30 parts of water, preferably 18 to 20 parts. Other mineral acids are used at comparable concentrations.

In addition to nitric, hydrochloric and sulfuric acids, other mineral acids or strong organic acids such as trichloroacetic acid are suitable. Acids which form insoluble complexes or deleterious compounds with tungsten are, of course, not suitable, such as tartaric acid.

It is usually desirable to obtain the tungsten in as concentrated a solution as possible. It has been found that the amount of water in which the ammonium paratungstate is slurried plays an important role in the economics of the process. Thus, a 5% or 10% slurry (calculated on $WO_3$ basis) may be converted to ammonium metatungstate in from 1 to 2 hours inclusive of the period required to stabilize it. However, as the concentration of metatungstate in the slurry increases, the time required for conversion of the para to the meta form increases rapidly. This is probably due to the fact that only that portion of the paratungstate which is in solution is rapidly converted and that the succeeding portions of the paratungstate which go into solution dissolve at correspondingly slower rates as the concentration of the metatungstate in the solution increases.

The fact that the reaction requires an additional 4 to 5 hours to reach a constant pH value even after it is completely dissolved is evidence that the primary reaction is one in which the polymeric paratungstate ions convert relatively slowly to polymeric metatungstate ions. This is a more plausible explanation of the conversion than the concept that the acid is responsible for extracting two molecules of ammonia from the paratungstate. The acid merely ensures the presence of the most favorable conditions for the para polymer to rearrange into the meta polymers. To maintain this favorable condition, it is necessary to continue the addition, when strong acids are used, of the acid as ammonia is released during the rearranging reaction.

It is preferred to conduct the rearrangement reaction in a slurry containing what is considered the optimum amount of from 10% to 22% preferably 12% to 18% calculated as $WO_3$ on the resultant ammonium metatungstate solution. This solution can then be evaporated in a normal manner to a concentration of 30% or more, or if desired, it can be evaporated still further to obtain ammonium metatungstate crystals.

While with mineral acids the reaction proceeds most rapidly when the pH is between 1.75 and 2.2, it is preferable before concluding this step of the operation to readjust the pH to approximately 3.5 by the addition of ammonia, this being the pH normally associated with commercial ammonium metatungstate. Below the pH of 1.75 hydrated tungstic oxides are formed while above about 2.2 the reaction slows down appreciably. Nevertheless while the pH range of 1.75–2.2 is preferred because of the faster conversion rate and thereby more economical and practical operation, it is also possible according to this invention to effect solution with the pH in the range of 2.2–3.5 although at a slower and less practical rate. When the solution is not sufficiently agitated or the acid is run in at too fast a rate or too concentrated an acid is used, local concentration of acid in which the pH falls below 1.75 leads to formation of insoluble hydrated tungstic oxide.

The amount of acid required is essentially that needed to stoichiometrically combine with the two ammonia ions released by the ammonium paratungstate when it converts to the meta form. However, the governing factor for the addition of acid is the pH. When the pH, lowered to 1.75 by an increment of acid, fails to rise after a short period of time the acid addition is slowed or stopped.

From the above characteristics of the reaction, it is apparent that the acid is used to form an environment of the proper acidity in which the equilibrium between the ammonium paratungstate and the metatungstate as shown in the equation shifts toward the right relatively slowly. As ammonia is released in this process it uses up the acid and more has to be provided to maintain the correct pH environment.

It has been further discovered that organic acids can be used to advantage in the conversion of ammonia paratungstate to ammonium metatungstate. The efficacy of these acids is based on their acidity in aqueous solution. In general the suitability of these acids can be judged by their dissociation constants. Roughly, they can be divided into three general groups. Group I comprises those acids which have a Dissociation Constant represented by $N \times 10^{-1}$ or $N \times 10^{-2}$ where N is a number from 1 to 9.9. These acids are represented by, among others, trichloracetic or oxalic acid which in solution have pH values below 1.75 and are applicable to the process if they are added in the same way as mineral acids. Group II, which is of most interest, consists of those acids whose Dissociation Constants are $N \times 10^{-3}$, $N \times 10^{-4}$ and $N \times 10^{-5}$. Such acids are represented by, among others, formic, acetic, propionic, lactic, glycolic, glyoxylic and succinic. The monobasic acids of this group are those preferred in the practice of this invention, particularly those whose Dissociation Constant is $N \times 10^{-3}$ or $N \times 10^{-4}$ as these generally result in more rapid solution. Such acids include formic, lactic and glycolic acids. Acids such as acetic and propionic with Dissociation Constants of $N \times 10^{-5}$ react at a slower rate.

The Group III acids are those with Dissociation Constants of $N \times 10^{-6}$ or less. Such acids are represented by carbonic. Dibasic or tribasic acids in which the first hydrogen is represented by a Dissociation Constant that falls within Groups I and II generally will react in the same manner as a monobasic acid of these groups until the first hydrogen has been neutralized after which it will proceed at a slower rate as generated by the Dissociation Constant of the second hydrogen atom.

The organic acids of Group II can be added directly to the ammonium paratungstate solution, boiled so that the proper pH range as hereinbefore stated is continuously preserved throughout the time that it takes for ammonium paratungstate to become soluble. The rate at which this solution takes place is related to the value of the pH induced by the acid used. It is understood that this value will be above 1.75, thus maintaining a condition in which hydrated tungsten oxides do not form.

As a general rule the organic acids exert a catalytic effect on the solution of ammonium paratungstate. This eliminates much of the period of stabilization that is required with the inorganic acids. Thus, the use of an organic acid results in the formation of a stable solution virtually as soon as visual examination indicates that no crystalline paratungstate is in the slurry. Generally, if there is a lag in conversion beyond this point, it is taken care of in the time required to concentrate the solution. Acids with a Dissociation Constant of $N \times 10^{-3}$ generally give lower pH values in the finished solution and more rapid solubility than acids with Dissociation Constants of $N \times 10^{-5}$ which, in general, are relatively slow. In a special case, oxalic acid with a Dissociation Constant of $6.5 \times 10^{-2}$ would normally fall into Group I. However, it can be used as a Group II acid by the addition of enough ammonia to neutralize the first hydrogen. The Dissociation Constant for the second acid hydrogen is $6.1 \times 10^{-5}$.

The temperature at which the solubilization is carried out is important. Where an organic acid is used there is little or no solubility below 50° C. Between this temperature and 101° C., which is the boiling point of the solution, rate of solubility increases markedly with increase in temperature. Therefore when using an organic acid a temperature advantageously above 70° C. is used, preferably above 90° C., and more preferably 95° C. to 101° C. When an inorganic acid is used the temperature is not quite as important, but for faster rate of solution it is preferred to use temperatures in excess of 50° C., preferably 70° C. to 101° C. Temperatures above the boiling point of the solution are also satisfactory provided pressure equipment is used. However, no particular advantage is gained by exceeding a temperature of 120° C.

When inorganic acids are used the solution may be evaporated to dryness to produce a water soluble product which is essentially ammonium metatungstate plus a small amount of ammonium salt the anion of which is that of the acid used. When organic acids are used the product obtained when the solution is evaporated is generally at least in part water insoluble. This indicates that a double salt of the acid and ammonium metatungstate is probably formed either during the solubilization or when the solution goes to dryness.

For economy and easy availability, as well as the other reasons recited herein, formic, acetic and lactic acids are preferred in the practice of this invention.

Formic acid has certain particular advantages. It is the most economical to use. It produces an almost clear solution, and the byproduct ammonium formate is easily removed in subsequent use of the solution. Except for formic and acetic acids, the monobasic acids generally show a slight cloudiness in the solution which is difficult to remove by filtration unless it is allowed to stand for a day or two. This is probably colloidal hydrated tungstic oxide. The amount of such precipitate, however, is only in the order of 0.1%–0.2% of the tungsten contained.

In using organic acids of Group II, the amount required is that stoichiometrically calculated to neutralize the two ammonia ions to be released in the conversion of the paratungstate to the metatungstate, plus sufficient excess to ensure at the end of the reaction a pH less than 4, preferably about 3.5. There is no need, as in the case of a highly dissociated acid, to maintain a constant watch upon the pH of the slurry. However, many of these organic acids have low boiling points, are readily steam distilled and in an open kettle are lost, making it difficult to complete the reaction. It is therefore necessary and desirable when using formic acid, particularly, and for other organic acids, to carry out the reaction in a refluxing system which returns volatilized acids to the slurry.

In these examples the highly refractory commercially available ammonium paratungstate referred to above as being very difficult to convert to a highly soluble form is used, in a finely divided form. However, the process of this invention can also be applied to various other types of ammonium paratungstate including those more amenable to prior art methods for conversion to the more soluble or ammonium metatungstate form.

EXAMPLE I

To 1,200 ml. of deionized water in a 2,000 ml. beaker equipped with a stirrer and heated by a water bath is added 200 g. of the refractory type ammonium paratungstate. This contains 89.11% $WO_3$. The pH of this slurry is 4.7. The slurry is heated and stirred. When the temperature reaches 60° C. the dropwise addition of a dilute solution of nitric acid is initiated. This nitric acid solution comprises 25 ml. of 70% $HNO_3$ diluted to 500 ml. of solution with deionized water. After 10 minutes of such acid addition the pH of the solution drops to 2.1 and the pH is maintained, by appropriate addition of acid, at 2.1–1.75, and a temperature of 75–77° C. is maintained. After 4 hours at these conditions, 10 ml. of 28% aqueous ammonia diluted with 20 ml. of water is added to bring the pH up to 3.5. The temperature is held at 77° C. for another hour. During this time the pH increases from 3.5 to 4.55. Additional nitric acid solution is then added over the next 1½ hours to stabilize the pH at 3.5. During the digestion, the pH of the solution is continually monitored by a pH meter equipped with a glass electrode. Overnight the pH slowly rises to 4.15. The solution is practically water-white with about 0.1% of the $WO_3$ in the system settling on the bottom of the beaker as a white residue of hydrated tungstic oxide. Essentially all of the $HNO_3$ solution is added. The volume of the resultant liquor is about 1,400 cc. This is divided into two equal portions of which one is concentrated by evaporation to a weight of 297 g. to produce a 30% $WO_3$ solution. After standing for two more days there is some further settling of colloidal material, but this is negligible. The final solution has a pH 3.45, a specific gravity of 1.389 and assays 30.4% $WO_3$, 3.69% $NO_3$ and 2.1% $NH_3$. The second portion is allowed to stand two days before filtering. The pH is 4.25 and it is also concentrated to a 30% solution. Samples of these solutions after standing for a number of weeks show only a negligible amount of material settled to the bottom. Parts of the 30% solutions are evaporated to dryness and the precipitates prove to be water soluble.

EXAMPLE II

The procedure of Example I is repeated using, in place of the nitric acid, an acid solution consisting of 14.16 ml. of 98% $H_2SO_4$ diluted to 500 ml. with deionized water. The temperature is maintained at 80° C.±2° C., and the pH is maintained above 1.75. The initial pH of 4.5 in the original slurry is lowered to 1.75 by the addition of acid during the first 60 minutes. Thereafter more acid is added intermittently during the solubilization period of two hours to maintain the pH between 1.75 and 2.0 Then a slight amount of ammonia is added to raise the pH to 3.5. The pH still increases slowly over the next hour, and it is necessary to add a further amount of acid to bring it back to 3.5. The total operation to obtain a clear stable solution requires about 6 hours.

EXAMPLE III

Example I is repeated using, in place of the nitric acid, a 5% solution of hydrochloric acid prepared by diluting 56.1 ml. of 37.5% HCl to 500 ml. with deionized water. The temperature is maintained at 77–80° C. The pH is initially dropped by addition of acid to 2.5 in 10 minutes and then maintained for the first hour at approximately 1.8 pH. After 80 minutes solution is complete and stabilization effected over another 100 minutes by allowing the pH to drift above 4, then adding a little acid to restore it to 1.75. Finally, by addition of a little ammonium hydroxide and further additions of acid as required, the pH is stabilized at 3.5 The entire operation requires 6½ to 7 hours.

EXAMPLE IV

A solution of lactic acid, 24.9 g. (85%) in 600 ml. of deionized water has a pH of 2.2. To this is added 100 g. of ammonium paratungstate (89% $WO_3$). This slurry is placed in a three-necked flask equipped with stirrer and reflux condenser and an electric mantle for heating. It requires about 25 minutes to raise the temperature of the slurry from room temperature to 100° C. The tungstate is fully dissolved in 55 minutes to a solution that is very slightly turbid and which boils at 101° C. The pH of this solution is 2.7. This is filtered and concentrated to a content of 30% $WO_3$. On further evaporation toward dryness a point is reached where a cloudy blue precipitate forms. The color indicates some reduction of tungsten.

EXAMPLE V

In the same equipment as in Example IV, a dilute solution comprising 10 ml. of 88% formic acid, specific gravity 1.2, and 600 ml. of deionized water is placed. To this is added 100 g. of ammonium paratungstate. The pH of this solution is 2.1. The temperature is raised to 101° C. in 25 minutes and in less than 70 minutes after this temperature is reached, the solution is complete with a final pH of 3.75. The resultant water-white solution is evaporated to a 30% concentration.

EXAMPLE VI

The procedure of Example V is repeated using formic acid (6.15 ml instead of 10 ml.). The initial pH is 2.15, and at the end it is 4.45. In boiling this solution down to a concentration of 30% $WO_3$, a small amount of paratungstate which had not been converted came out of solution. It is apparent that the pH of 4.45 is too high to ensure complete conversion of the para to the meta form, and that there was insufficinet excess formic acid in this experiment to give as desired a final pH of less than 4. This is probably due to the volatility of the formic acid. The greater excess of formic acid used in Example V is more satisfactory.

EXAMPLE VII

The procedure of Example IV is repeated using a solution of 23.8 g. of malonic acid, 600 ml. of deionized water and 100 g. of ammonium paratungstate. With an initial pH of 1.75, substantially complete solution is effected in 1½ hours at 101° C, ending with a very slight turbidity in the solution and a pH of 2.85. This solution assays 12.3% $WO_3$.

EXAMPLE VIII

A solution of 24.9 g. of 70% glycolic (hydroxyacetic) acid in 600 ml. of water is used to dissolve 100 g. of ammonium paratungstate by the procedure of Example IV. The initial pH at 25° C. is 2.05. Solution is completed in 55 minutes at 101° C., with a final pH of 2.9.

EXAMPLE IX

The procedure of Example IV is repeated using a solution consisting of 22.6 g, of trichloroacetic acid in 600 ml. of deionized water. Within 2 or 3 minutes after the addition of 100 g. of ammonium paratungstate to this solution, and before the temperature has gone above 30° C., the crystalline nature of the ammonium paratungstate becomes contaminated with colloidal material characteristic of hydrated tungstic oxide. The pH of the slurry is 0.5. This slurry can not be put into solution.

EXAMPLE X

Using the procedure of Example I, a slurry of 200 g. of ammonium paratungstate in 1,200 ml. of deionized water is dissolved by the intermittent addition of a solution consisting of approximately 64.85 g. of trichloroacetic acid made up to 500 ml. in deionized water. A temperature of 76–81° C. is maintained during the addition, and the pH is held between 1.75 and 2.0 at all times. The time required for complete solution is 105 minutes.

EXAMPLE XI

In the same experimental equipment as Example IV, the procedure of Example IV is repeated using a solution consisting of 24.6 g. of monochloroacetic acid in 600 ml. of deionized water. The pH of this solution is initially 1.0 but this rises immediately after 100 g. of ammonium paratungstate is added and the slurry is heated and stirred. The dissolving reaction requires approximately an hour and a half, and the pH of the final solution is 2.3. This is slightly cloudy and on standing a residue collects, settles and is filtered off. The amount of residue indicates that the initial pH below 1.75 is undesirable.

EXAMPLE XII

The procedure of Example IV is repeated using a solution of 29 g. of oxalic acid in 600 ml. of deionized water. The initial pH is 1.45. After 100 g. of ammonium paratungstate are added, the heating and stirring are started. After 15 minutes the pH is 1.75, the temperature is 50° C. and a heavy insoluble precipitate of tungstic oxide is formed which is again due to the low initial pH. As the heating is continued the solids in the slurry assume the typical yellow color of tungstic oxide while the pH of the slurry rises to 1.9.

EXAMPLE XIII

The procedure of Example IV is repeated using a solution comprised of 29 g. of oxalic acid in 600 ml. of deionized water. To this is added 15 ml. of ammonium hydroxide which is sufficient to neutralize one acid hydrogen. To this is added 100 g. of ammonium paratungstate to give a slurry having a 2.05 pH. Within 80 minutes after heating is started, with the temperature being raised to and maintained at 101° C., the tungstate is all dissolved to give a solution having a 4.35 pH. A slight residue weighing 1.4 g. is filtered off.

EXAMPLE XIV

The procedure of Example I is repeated using a solution consisting of 34.4 g. tartaric acid and having an initial pH of 1.9. To this is added 100 g. ammonium paratungstate. Before the temperature has been taken above 82° C., the tungstate is completely dissolved (about 20 minutes). The pH at this point is 1.45. On starting to cool a precipitate appears which turns pale green and becomes heavier than the colloidal cloudiness described above. It is not possible to put this precipitate into solution by further treatment. The drop in pH indicates that another acid hydrogen is released, which indicates that the tungsten compound reacts with the two OH groups of the tartaric acid.

EXAMPLE XV

The procedure of Example XIV is repeated except that no heat is applied and solution is attempted at ambient temperature. The initial pH is 1.85 and after 3 hours it has dropped to 1.6. A precipitate of slightly yellowish color is formed, distinct from the crystalline ammonium paratungstate. Solution can not be effected.

EXAMPLE XVI

The procedure of Example IV is repeated using a solution consisting of 29.5 g. citric acid (which is calculated at ⅓ mol equivalent of the amount of formic acid ordinarily used, or about 10% excess if all three acid groups function in dissolving the ammonium paratungstate) and 958 g. of deionized water. To this is added 200 g. of ammonium paratungstate. It requires 20 minutes to reach 100° C. Small samples are removed at hourly intervals. Compared to formic acid, solution is considerably more rapid for the first hour with approximately 70% of the paratungstate going into solution. Thereafter the amount of soluble tungstate does not increase appreciably whereas a comparable formic acid experiment will go to completion. It is evident that only two of the three hydrogen atoms in citric acid are utilized to any extent. Dissociation Constants for the first two hydrogens in citric acid are $8.4 \times 10^{-4}$ and $1.8 \times 10^{-5}$ respectively which fall in Group II. The third hydrogen has a Dissociation Constant of $4 \times 10^{-6}$ which puts it in Group III confirming that it would be negligibly effective. The pH of citric acid in solution is approximately 2.1.

EXAMPLE XVII

The procedure of Example IV is repeated using a solution consisting of 13.5 g. of succinic accid and 600 ml. of deionized water. The amount of dibasic acid is calculated to be equivalent to monobasic formic acid used in 10% excess, i.e., both acid hydrogen atoms being assumed to be available. The Dissociation Constants for succinic acid are $6.6 \times 10^{-5}$ for the first acid hydrogen and $2.8 \times 10^{-6}$ for the second acid hydrogen. The pH of the solution was 2.45. The rate of solution is unexpectedly rapid, although not as rapid as with formic acid. It requires 120 minutes to effect solution. The final pH is 4.65. It is lowered with a little formic acid to pH 3. Succinic acid is similar to tartaric acid in structure except that the two OH groups on the 2 and 3 carbon atoms are not present. As the pH when succinic acid was used went up in the normal manner rather than down as when tartaric acid was used, the indication is that the presence of the OH groups of the latter are responsible for the insoluble complex formed when tartaric acid is used as in Example XIV. It also indicates that some organic acids exert a catalytic action beyond that to be expected from their Dissociation Constants.

EXAMPLE XVIII

The procedure of Example IV is repeated using a solution comprising 13.3 g. of fumaric acid in 600 cc. of water. As fumaric acid is relatively insoluble, 0.7 g. per 100 ml. of water at 25° C. and 9.8 g. per 100 ml. of water at 100° C., it is necessary to add the acid as well as the 100 g. of ammonium paratungstate as a slurry at room temperature and to effect solution of the acid as the temperature is increased. The pH of the initial slurry is 2.25. In 85 minutes the ammonium paratungstate has completely dissolved, yielding a solution of 3.65 pH. The structure of fumaric acid is similar to that of tartaric acid except that instead of the hydroxy groups on the middle two carbon atoms, those of fumaric acid are joined by a double bond. Similar to Example XVII, this example indicates that the OH groups in tartaric acid are the cause for the failure of tartaric acid to dissolve the tungstate. Fumaric acid with Dissociation Constants of $1.0 \times 10^{-3}$ and $3.0 \times 10^{-5}$ is correctly expected to effect rapid solution.

EXAMPLE XIX

The procedure of Example IV is repeated using a solution consisting of 15.3 ml. of glacial acetic acid and 600 ml. of deionized water. To this is added 100 g. of ammonium paratungstate. Initially the pH is 2.6. The temperature is raised to 101° C. within 25 minutes and maintained at that temperature. After 155 minutes total heating time, the ammonium paratungstate has dissolved to yield a solution of 4.45 pH.

EXAMPLE XX

The procedure of Example V is repeated three times using varying amounts of water with 20 ml. of formic acid and 200 g. of ammonium paratungstate. When the solution totals 1200 ml., complete solubility is attained 55 minutes after a temperature of 100° C., is reached. When the solution is 1000 ml., it requires 180 minutes to get 99.5% dissolved.

EXAMPLE XXI

The procedure of Example V is repeated three times using different temperatures with a solution consisting of 10 ml. of 85% formic acid, 600 ml. of water and 100 g. of ammonium paratungstate. At 50° C., 16.2 g. is dissolved in 190 minutes which is not essentially greater than that which will dissolve in water at ambient temperature. At 80° C., 64.0 g. is disolved in 190 minutes, while at 90° C., solution is complete in 205 minutes. The rate of solution shown effected by formic acid in Example V is 100% in less than 70 minutes. All times are based on time at the specified temperature.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. The process for converting a material consisting essentially of relatively insoluble ammonium paratungstate to a solution of essentially ammonium metatungstate comprising the steps of
    (a) forming a water slurry containing up to approximately 22 percent by weight of said ammonium paratungstate calculated on the basis of $WO_3$ content;
    (b) maintaining the pH of the water in said slurry in the range of 1.75–3.5 by the addition of hydrogen ions to said slurry; and
    (c) maintaining the temperature of said slurry in the range of 50–120° C. until said ammonium paratungstate is substantially completely dissolved in said water and converted to the metatungstate state.

2. The process of claim 1 in which pH is maintained at 1.75–2.2 for at least a substantial portion of the heating period.

3. The process of claim 2 in which said slurry contains approximately 12–18 percent by weight of said ammonium paratungstate calculated on the basis of $WO_3$ content, said temperature is in the range of 70–101° C., and said slurry is agitated during the period said ammonium paratungstate is being dissolved in said water, and continuing to agitate said solution and to maintain said pH and said temperature until a constant pH in the range of 1.75 to 3.5 is attained.

4. The process of claim 2 in which said pH is maintained by the gradual addition of a mineral acid.

5. The process of claim 2 in which said pH is maintained by the gradual addition of an organic acid having a dissociation constant in the range of $N \times 10^{-1}$ to $N \times 10^{-2}$ where N has a numerical value of 1–9.9, said acid having no functional groups other than acid groups reactive with said tungstate.

6. The process of claim 2 in which said pH is maintained by the presence of an organic acid having a dissociation constant in the range of $N \times 10^{-3}$ to $N \times 10^{-5}$, where N has a numerical value in the range of 1–9.9 said acid having no functional groups other than acid groups reactive with said tungstate.

7. The process of claim 2 in which said pH is maintained by the gradual addition of nitric acid.

8. The process of claim 2 in which said pH is maintained by the gradual addition of hydrochloric acid.

9. The process of claim 2 in which said pH is maintained by the presence of acetic acid.

10. The process of claim 2 in which said pH is maintained by the presence of lactic acid.

11. The process of claim 2 in which said pH is maintained by the presence of formic acid.

12. The process of claim 11 in which said slurry contains approximately 12–18 percent by weight of said ammonium paratungstate calculated on the basis of $WO_3$ content, and said temperature is in the range of 70–101° C.

13. The process of claim 12 in which the formic acid is present in an amount sufficient to react with ammonia liberated from the paratungstate during the solubilization thereof and to provide sufficient excess to maintain the desired pH.

14. The process for converting a material consisting essentially of relatively insoluble ammonium paratungstate to a more soluble solid which is essentially ammonium metatungstate comprising the steps of
    (a) forming a water slurry containing up to approximately 22 percent by weight of said ammonium paratungstate calculated on the basis of $WO_3$ content;
    (b) maintaining the pH of the slurry in the range of 1.75–3.5 by the addition of hydrogen ions to said slurry;
    (c) maintaining the temperature of said slurry in the range of 50–120° C. until said solid ammonium paratungstate is substantially completely dissolved to form a solution in which the tungstate values have been essentially converted to the metatungstate state;

(d) removing at least some water from said solution said amount of water removed being sufficient to effect at least partial crystallization of the ammonium metatungstate values present in the solution; and (e) recovering said ammonium metatungstate crystal so formed.

15. A process as stated in claim 14 wherein said pH is maintained in the range of 1.75–2.2 for at least a substantial portion of the heating period and the water slurry contains from 12–18 percent ammonium paratungstate calculated on the basis of $WO_3$.

16. A process of claim 15 in which the hydrogen ions are supplied in the form of a dilute formic acid

References Cited

UNITED STATES PATENTS 3,175,881    3/1965    Chiola et al.            23—51

OTHER REFERENCES

Taylor, "Journal of American Chemical Society," vol. 24, 1902, pp. 629–643 (pp. 629–636 of particular interest).

HERBERT T. CARTER, Primary Examiner

U.S. Cl. X.R.

23—51